J. R. WITZEL.
METHOD OF BACTERIA DESTRUCTION BY PRESSURE.
APPLICATION FILED JAN. 29, 1917.
1,269,562.
Patented June 11, 1918.
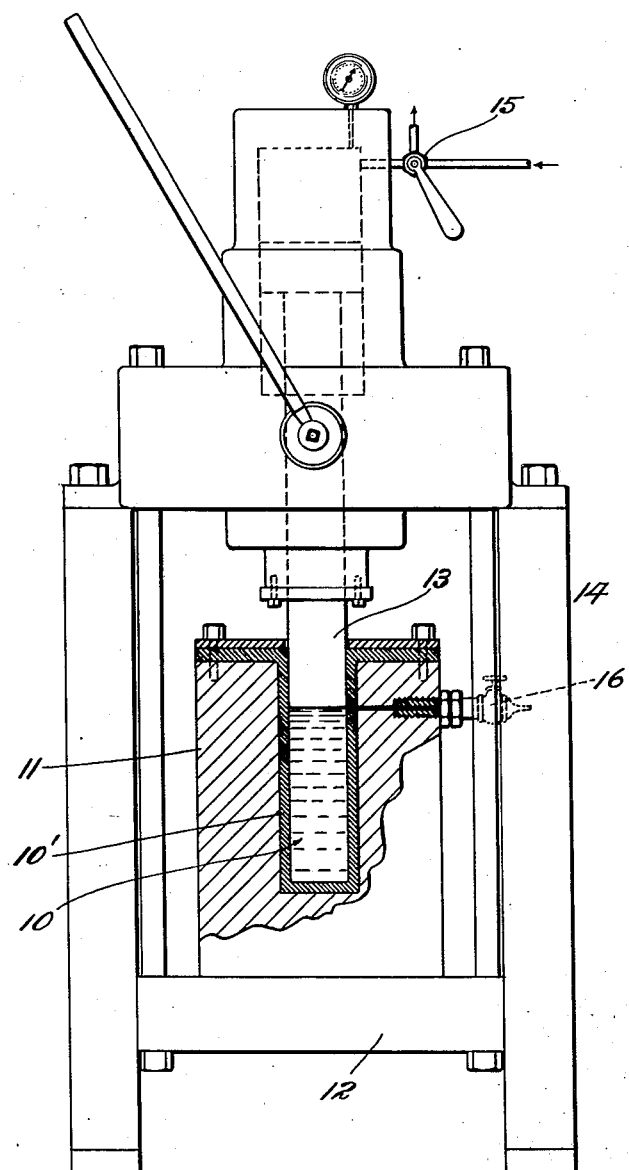
Inventor
Joseph R. Witzel,
By William J. Jackson
Attorney

UNITED STATES PATENT OFFICE.

JOSEPH R. WITZEL, OF PHILADELPHIA, PENNSYLVANIA, ASSIGNOR TO FOOD STERILIZATION COMPANY, A CORPORATION OF DELAWARE.

METHOD OF BACTERIA DESTRUCTION BY PRESSURE.

1,269,562.  Specification of Letters Patent.  Patented June 11, 1918.

Application filed January 29, 1917. Serial No. 145,290.

*To all whom it may concern:*

Be it known that I, JOSEPH R. WITZEL, a citizen of the United States, residing at Tacony, Philadelphia, county of Philadelphia, and State of Pennsylvania, have invented a certain new and useful Method of Bacteria Destruction by Pressure, of which the following is a specification.

The principal object of the present invention resides in the method of bacteria destruction by the application of pressure ranging more or less between seventy-five thousand to one hundred thousand pounds to the square inch at desired temperature and for a period of time varying according to the commodity being treated, whereby organisms are destroyed and cell bodies are ruptured or disintegrated, so that the substances thereof are more intimately diffused throughout the product being sterilized.

The invention consists of the improvements hereinafter described and finally claimed.

The nature, characteristic features and scope of the invention will be more fully understood from the following description taken in connection with the accompanying drawings forming part hereof and which are more or less diagrammatic in character and for illustrative purposes, a view of a hydraulic press is disclosed.

For the purpose of illustrating my invention, I have shown in the accompanying drawings one form thereof which is at present preferred by me since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In practising my method, I may treat water, wine, whisky, milk, cream, tinctures, emulsions, serums, antitoxins, fruits, fruit juices, butter, ice cream and other commodities too numerous to mention, either solid, semi-solid or fluid in nature. According to my method, I employ a high degree of pressure of any desired physical form as air pressure, water pressure, gas pressure, steam pressure and the like, either constant or intermittent in character. I may also employ a process of sterilization by evacuation and pressure. By such process, I first create a vacuum to expand the cell bodies of the commodity and then subject the commodity to high pressure to break down the previously expanded cell bodies, whereby the substances thereof are more intimately diffused throughout the commodity being treated. In practice, the pressure is caused to remain for at least a minute and as much longer as may be desired. Further the flavor of the commodity being treated is increased or brought out by my process because of bacteria destruction. The degree of pressure I employ, and the time consumed varies according to the article being treated for bacteria destruction. For example let it be assumed that the bacterial content of fresh milk is to be destroyed for attaining a sterile sample. The activity of milk enzyms in such case may require as much as one hundred thousand pounds to the square inch of pressure at room temperature for a period of time covering many hours before cultures of bacteria are obtainable. On the other hand, it has been demonstrated that old milk subjected to the same degree of pressure yields a culture of bacteria after a few minutes of pressure application. That the application of high pressure, commercially considered, is efficient for desired purposes is shown by the fact that in the case of old milk bacteria aggregating thirty or more millions per *c. c.* may be reduced to a hundred or less by the application of say one hundred thousand pounds to the square inch for a few minutes. A description of my process will now be given in connection with the drawings and for example let it be assumed that fruit juice is to be compressed. The juice is placed within the cavity 10 of a heavy steel cylinder 11 which latter is positioned between the bed plate 12 and the ram 13 of a heavy hydraulic press 14. The cavity 10 is lined with rubber 10' securely clamped to the cylinder 11 as shown. Pressure is then applied by opening two-way valve 15 to cause ram 13 to descend into cavity 10 upon the contents thereof. Pressure of desired pounds per square inch for as long a period of time as required or is necessary is permitted to remain. It has been found for instance that pressure of one hundred thousand pounds per square inch for a period of about ten minutes will stop fermentation. I have discovered, however, that better results are obtained by creating a vacuum within cavity 10 before applying severe pressure to contents thereof. For instance, after the cavity has been properly filled with a suitable commodity the ram may be lowered to the point shown in the drawings, the valve 16 being open and then the valve 16 is closed and the ram raised to create a vacuum with said cavity. In this connection the rubber lining 10' serves to assist in creating a maximum vacuum as will be readily understood. The vacuum created serves to expand the cell bodies of the product. Pressure as before described is now applied and the expanded cell bodies are now broken down or finely divided. By my process I am enabled to practice cell body divisibility, sterilization or similar treatment of fluids or semi fluids, whereby in the case of milk, cream may be quickly separated therefrom, or butter may be rapidly formed, in the case of whisky fusel oil may be removed therefrom, fluids may be blended, dough may be compressed, fermentation prevented, nutrition increased, and many other articles may be treated so as to be subjected to agitation, succision, sterilization, and the cell bodies of all of the articles separated or divided and other desirable results produced. By my process or method I may of course as occasion demands employ heat or cold to the product being treated in conjunction with compression or compress at room temperature.

It will now be apparent that I have devised a novel and useful method which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

1. The process for the destruction and disintegration of cell bodies and organisms held in suspension in a fluid, which consists in confining such fluid, cell bodies and organisms and exhausting the pressure to cause an expansion of said cell bodies, and thereupon applying a pressure to an extent sufficient to break down such bodies whereby the organisms are destroyed and the cell bodies are ruptured or disintegrated so that the substances thereof are more intimately diffused throughout the containing fluid.

2. The process for the destruction and disintegration of cell bodies and organisms held in suspension in a fluid, which consists in confining such fluid, cell bodies and organisms and exhausting the pressure to cause an expansion of said cell bodies, and thereupon applying a pressure of substantially between 75,000 and 100,000 pounds to the square inch to break down such bodies whereby the organisms are destroyed and the cell bodies are ruptured or disintegrated so that the substances thereof are more intimately diffused throughout the containing fluid.

In testimony whereof, I have hereunto signed my name.

JOSEPH R. WITZEL, M. D.